Figure 1A:
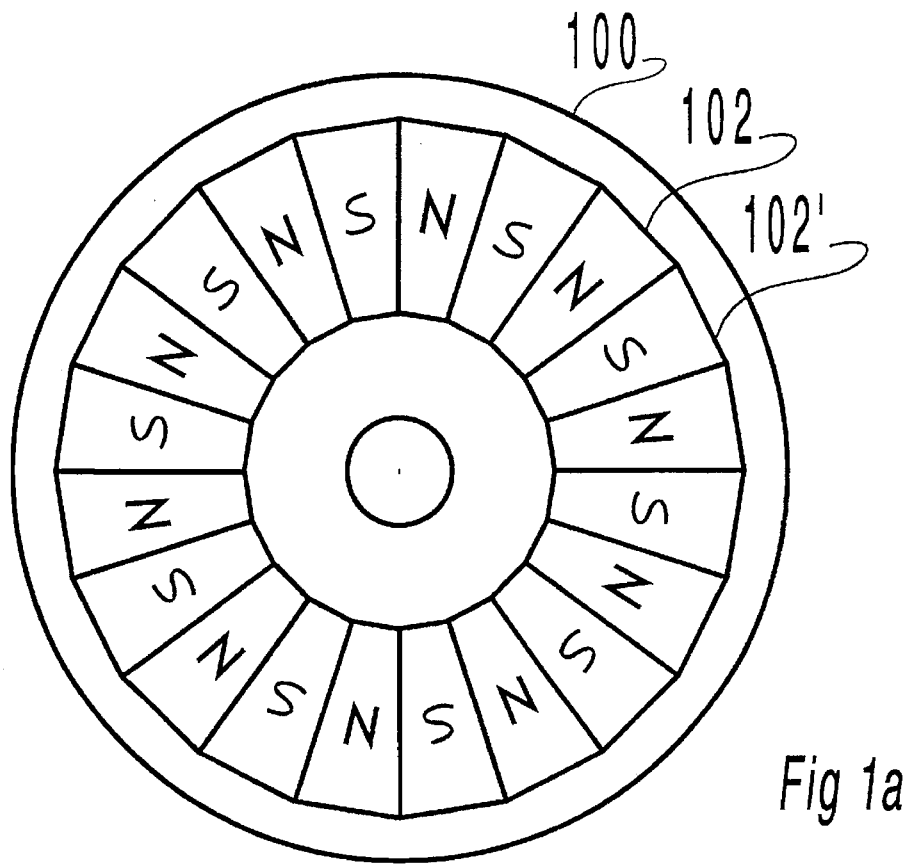

United States Patent [19]

Clark

[11] Patent Number: 5,656,880
[45] Date of Patent: Aug. 12, 1997

[54] DISCOIDAL DYNAMO-ELECTRIC MACHINE

[75] Inventor: Peter Bruce Clark, Auckland, New Zealand

[73] Assignee: Cadac Limited, Auckland, New Zealand

[21] Appl. No.: 424,332

[22] PCT Filed: Jan. 28, 1994

[86] PCT No.: PCT/NZ94/00005

§ 371 Date: Apr. 24, 1995

§ 102(e) Date: Apr. 24, 1995

[87] PCT Pub. No.: WO94/19859

PCT Pub. Date: Sep. 1, 1994

[30] Foreign Application Priority Data

Feb. 17, 1993 [NZ] New Zealand ............... 245928
May 6, 1993 [NZ] New Zealand ............... 247564

[51] Int. Cl.⁶ ............... H02K 1/22; H02K 21/12; H02K 1/12
[52] U.S. Cl. ............... 310/268; 310/156; 310/254
[58] Field of Search ............... 310/154, 156, 310/268, 261, 254, 179

[56] References Cited

U.S. PATENT DOCUMENTS

| | | | |
|---|---|---|---|
| 4,167,692 | 9/1979 | Sekiya et al. | 318/138 |
| 4,228,384 | 10/1980 | Arnold, Jr. et al. | 318/254 |
| 4,629,920 | 12/1986 | Hermann | 310/156 |
| 4,633,149 | 12/1986 | Welterlin | 318/254 |
| 4,677,335 | 6/1987 | Ueda et al. | 310/268 |
| 4,710,667 | 12/1987 | Whitely | 310/268 |
| 4,820,949 | 4/1989 | Mizobuchi et al. | 310/90 |
| 5,184,040 | 2/1993 | Lim | 310/114 |
| 5,396,140 | 3/1995 | Goldie et al. | 310/268 |

Primary Examiner—Steven L. Stephan
Assistant Examiner—Michael Wallace, Jr.
Attorney, Agent, or Firm—Young & Thompson

[57] ABSTRACT

A discoidal dynamo-electric machine has a discoidal stator carrying a number of meandering copper windings imbedded in a substrate having a magnetic permeability of less than 20 relative to air, and a discoidal rotor mounted on a central shaft so that the rotor can be positioned close to and rotates in a plane parallel to that of the stator. The rotor has a circular array of permanent magnets mounted on a backing plate of mild steel, each of the magnets having a trapezoidal or a truncated sector of a circle shape, the magnets being closely spaced around the rotor to provide a series of closely apposed and alternating permanent magnetic poles.

16 Claims, 3 Drawing Sheets

DISCOIDAL DYNAMO-ELECTRIC MACHINE

TECHNICAL FIELD OF THE INVENTION

This invention relates to the field of dynamo-electric machines; particularly brushless direct-current electric machines (BDCMs) and more particularly to those BDCMs constructed in the pancake, or discoidal style.

BACKGROUND

A BDCM type of electric motor (or generator) confers a number of advantages over prior-art slotted armature motors, such as deletion of the sliding contacts at a commutator, absence of cogging, lighter weight, and higher efficiency. Most BDCMs are constructed in a pattern involving apposed (ie side by side) cylindrical surfaces between which the interaction of magnetic forces operating in a radial direction provides a torque. There is however a need for an efficient economical motor having a flattened, discoidal shape.

OBJECT

It is an object of the present invention to provide an improved discoidal dynamo-electric machine, or one which will at least provide the public with a useful choice.

STATEMENT OF THE INVENTION

In one aspect the invention provides a discoidal dynamo-electric machine having a discoidal stator and a discoidal rotor mounted on a central shaft so that the rotor can be positioned close to and rotate in a plane parallel to that of the stator, wherein the rotor has a circular array of permanent magnets thereon providing a series of closely apposed and alternating permanent magnetic poles.

Preferably the rotor is made of iron or steel, or another ferromagnetic material.

Preferably the windings meander on a repetitive series of radial paths, the number of such paths being preferably equal to the number of poles.

Because the magnetic poles are closely spaced around the rotor it is preferred that there is an even number of between 8 and 64 poles, in its most preferred form of the invention there are about 28 poles.

In another aspect the invention provides a BDCM using ferrite magnets together with a relatively wide air gap between rotor and stator.

In a third aspect this invention provides a pancake or discoidal BDCM in which the windings are upon or within a substrate having a magnetic permeability of less than 20, relative to air.

In a related aspect a ferromagnetic material having a permeability of over 20 may be placed beneath the windings. Preferably this material is selected from a range including powdered ferrite, iron tape, iron wire, or iron sand.

Preferably the magnets are strontium-ferrite and each has a trapezoidal or sector shape.

In a related aspect a ferromagnetic material having a permeability of over 20 may be placed beneath the windings. Preferably this material is selected from the group comprising powdered ferrite, iron or steel tape, iron or steel wire, or iron sand.

DRAWINGS

These and other aspects of this invention, which should be considered in all its novel aspects, will become apparent from the following description, which is given by way of example only, with reference to the accompanying drawings, in which:

FIG. 1a: is an illustration of the face of a first rotor for a preferred dynamoelectric machine.

Figure 1B:
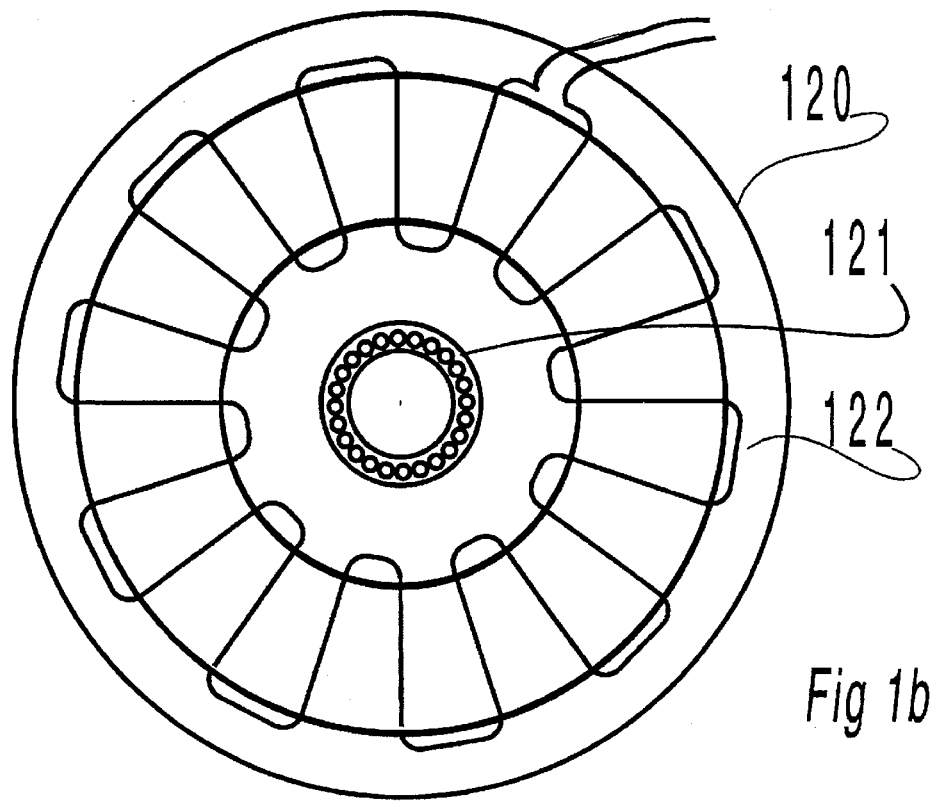

FIG. 1b: is an illustration of the face of a first stator for use with the rotor of FIG. 1a.

Figure 2:
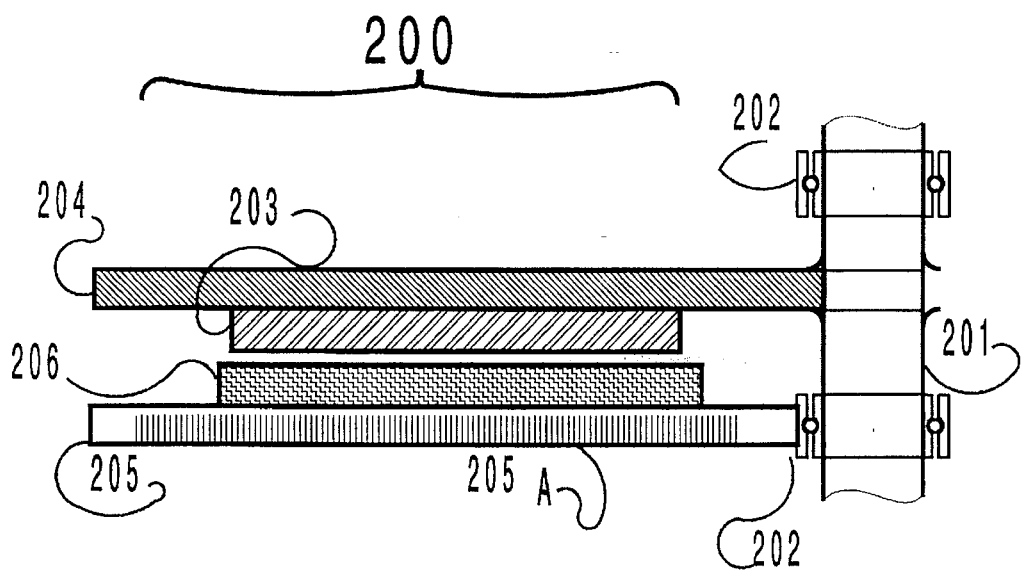

FIG. 2: is a sectional view on a radius through the rotor and stator of a motor of the present invention.

Figure 3:
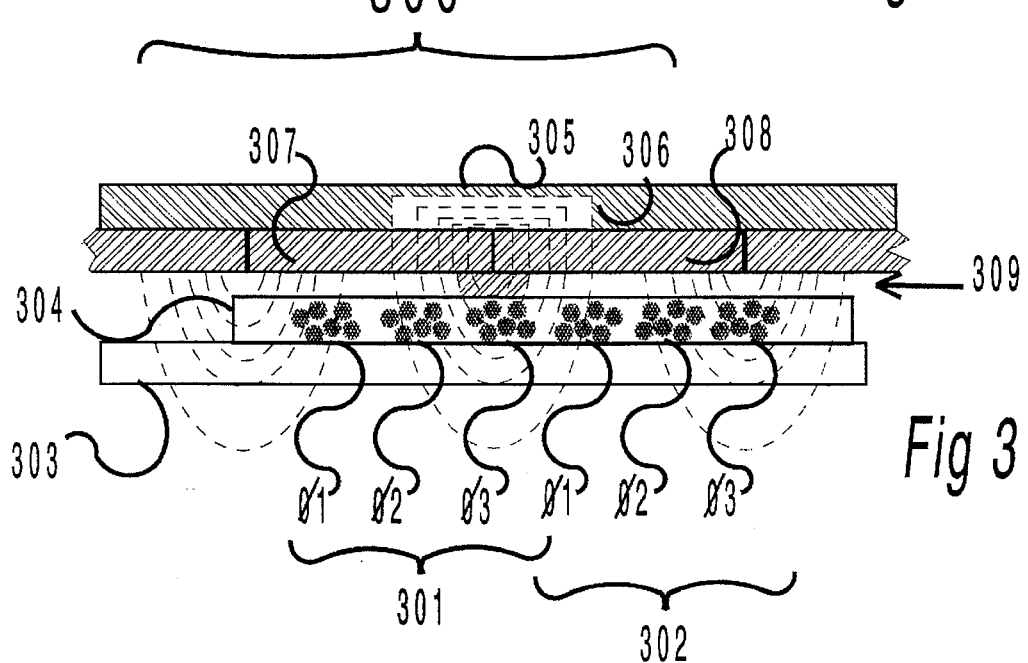

FIG. 3: is a sectional view along a tangent cutting the magnet array, showing flux lines and windings for the rotor and stator of a motor in accordance with FIG. 2.

Figure 4:
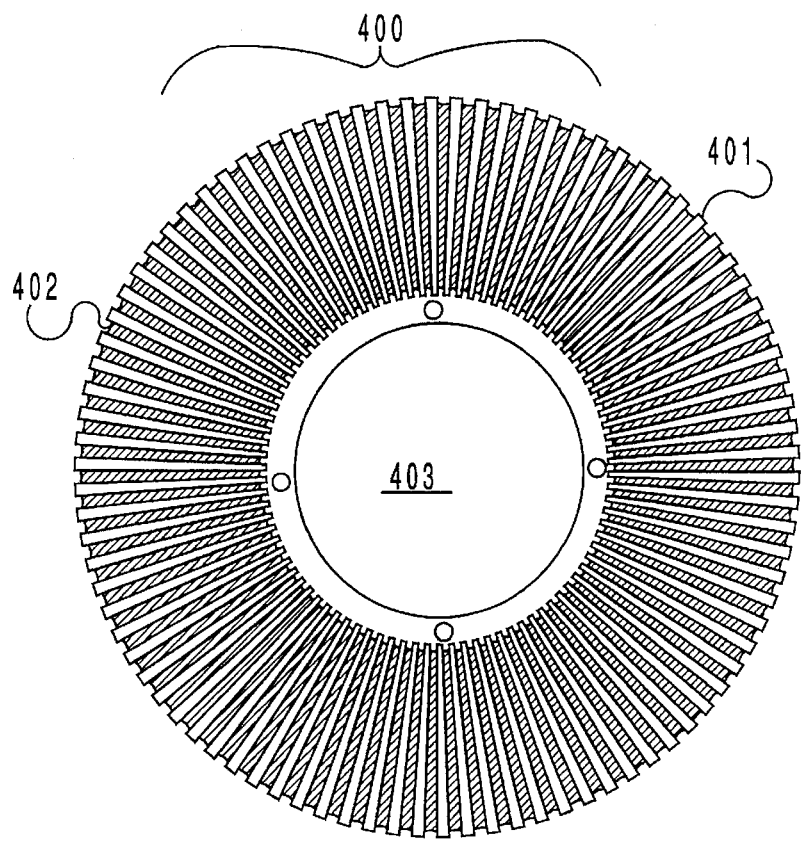

FIG. 4: is a surface view of the stator of a 28-pole motor.

Figure 5:
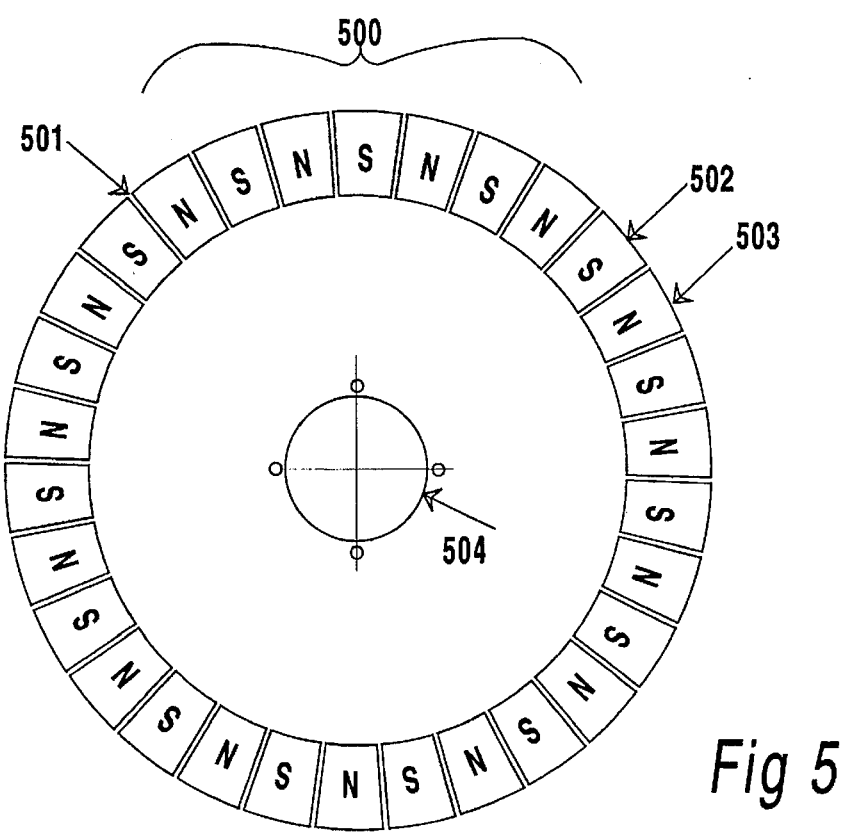

FIG. 5: is a surface view of the rotor of a 28-pole motor.

Figure 6:
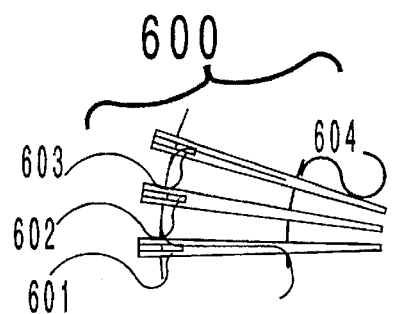

FIG. 6: is a surface view of part of a stator having magnetic-field sensors.

First Embodiment—FIGS. 1–3

This first embodiment of a dynamo-electric machine will be described with reference to a brushless DC Motor comprising two disks in a stack, one—a stator (120, 205, 303)—fixed to mountings (not illustrated) and the other—a rotor (100, 204, 305)—capable of rotation about its center on a shaft 201, which is preferably mounted on bearings 121, 202.

Generally there will be an array of windings 122, 301, 302 placed on one face of the stator/fixed disk, and an array of closely spaced permanent magnets 102, 102' . . . will be placed on one face of the rotor. This arrangement avoids the need for wiping contacts to transfer electricity; however the comparatively lower rotational inertia of a disk carrying windings plus the possibility of providing a fixed backing plate of a ferromagnetic substance having high permeability, to lead the flux lines more directly through the windings, may lead to further embodiment having a magnet array on a stator and windings on the rotor disk.

In general the ferrite magnets 102 . . . 203, 307, and 308 will be mounted as a circular array and presenting alternate poles on the exposed surface (as shown in FIG. 1a) using preferably adhesive means on a substantially flat plate of mild steel 100, 204, which will complete the magnetic circuit between one pole and its neighbours (as shown in FIG. 3–300 and in more detail at 306. Preferably the plate of mild steel will be firmly attached to the rotatable drive shaft 201 of the motor.

Preferably the permanent magnets of this invention are ferrite magnets. The optimum number of poles is believed to be 20, although a greater or lesser even integer number of poles may be preferred. For example a greater number may be preferred in the event that this motor is constructed with a wider diameter.

Preferably each ferrite magnet is in the shape of a flattened cube, having one pair of elongated sides. Optionally each magnet may be provided with one or more fastening holes or engagement means, capable of engaging with corresponding members placed on the surface of the mild steel disk. Fastening means are not shown in the radial section 200.

Preferably each ferrite magnet is shaped in the form of a truncated sector of a circle, as shown (102) in FIG. 1a, having an angle of 18 degrees between its sloping sides in the case of a 20-pole motor in order to maintain the preferred configuration of motors of this type; namely closely apposed magnetic poles along the elongated sides of each magnet. Other angles will be preferred for other numbers of poles. If only rectangular magnets are available, the condition of closely apposed magnetic poles may be approximated by increasing the number of poles.

Preferably the ferrite magnets are magnetised across their wide faces, so that the entire exposed surface of a mounted magnet is either a North or a South pole, as shown in FIGS. 1a and 3.

A second flat plane (the stator) preferably composed of a rigid, non-conducting material (120, 205, 303) is provided to serve as a support for the windings. Preferably this material has a low magnetic permeability, less than 20 relative to air (where air is taken as =1), and is thick enough to separate the fields generated by the windings from any nearby conducting or ferromagnetic substances in order to (a) minimize losses due to hysteresis and eddy currents, and (b) minimize losses due to unnecessarily high inductance. Windings may be attached to this surface by (for example) adhesives or embedment in grooves. In any case, the windings will preferably be potted in a substantially rigid matrix of a flame-retardant plastics material (as 304), such as an epoxy, a polyurethane, or a silicone rubber, and any one of a number of commercial products (e.g. "RYNITE" (a trade mark of Du Pont)) designed for electric appliances may be selected.

A preferred option for this type of motor is the use of a backing, behind the windings, of ferromagnetic material which serves to direct the lines of flux through the windings without much effect on their inductance. One preferred backing is shown as 205A in FIG. 2, representing a section through a number of turns of a 4 mm wide steel tape wound on itself outwards from near the center of the stator (like the turns of tape in an audio tape cassette). Optionally many turns of iron wire may be wound so as to occupy a comparable space. This ferromagnetic material is preferably moulded into the plastics matrix, so that it is held firmly and magnetostrictive noise is minimized.

Preferably the motor windings are wound in a three-phase configuration, which may be star, delta, or remain as separate windings depending on the preferred method for energisation of the windings. The windings are preferably wound in copper wire, although other fabrication techniques such as stamping from a sheet, or primed-circuit techniques may be employed. A preferred winding configuration is a rosette shape as per 122 in FIG. 1b (where one turn of one phase is shown), in which the radius lines will generate a magnetic field capable of interaction with the flux emanating from the magnets, and the inner and outer perimeter lines are simply connections. Assuming three electrical phases, windings of each phase are offset by (120/pole number) degrees from the adjacent phase. FIG. 3 shows the winding pattern in more detail. 301 shows three groups (phases) of ingoing windings—as wires—in section, and 302 shows three groups (phases) of outgoing windings, again in section.

In order to sequence the energisation of the windings, in order to create a torque, a controller having solid-state switches is preferred. Such controllers are commonly used in motor systems employing the BDCM family and are well-known to those skilled in the relevant arts, and may be synchronised to the position of rotation by Hall-effect or other magnetic sensors, optical sensors, or more preferably by sensing the back-EMF voltages generated during motion in un-energised windings. Some applications including traction applications may use magnetic sensors such as Hall-effect sensors and FIG. 6 shows at 600 a part of a stator assembly, bearing three magnetic sensors at 601, 602, and 603. Three sensors are usually sufficient. The sensors are mounted in the shoulder section of the slots of the stator. A single turn of windings is shown as the dotted line 604. This arrangement provides sensors at a spacing suitable for 60 degree timing purposes, while sensors may be placed in alternate slots for 120 degree timing.

A housing resistant to foreign bodies is preferred, although it is conceivable that a motor of this type could be integrated into the housing of an appliance such as—for example—a clothes washing machine, because it has been found that cylindrical topographies for motors of this type (our subset of BDCMs) may be constructed with a relatively large air gap between stator and rotor, and hence the amount of play found in an operating appliance such as a washing machine may not be excessive.

Embodiment 2—28-pole motor

This prototype embodies the features of the example above, but more closely specifies some operating parameters suitable for a discoidal motor for use in a direct drive washing machine.

The 28-pole motor has a stator comprising copper windings on a former, between a backing of (preferably) steel tape wound radially (like the tape in an audio cassette) and the magnet array on the rotor. Iron or steel wire is an optional alternative to the tape. The whole stator assembly is preferably embedded in a thermoplastics material such as "RYNITE"—a DuPont flame-retardant thermoplastic developed for electrical appliances.

The rotor comprises a steel backing plate, 330 mm in diameter and on its "magnetic surface"—the surface apposed to the copper windings—it carries 28 strontium-ferrite magnets, preferably of grade 8H. These are magnetised in place, after adhesive mounting, so that alternate north and south poles are produced on the surface and flux lines emanate from the surface and curve back into the nearest opposite pole. The thickness of each magnet is 9.5 mm; the outside radius is 37 mm, the inside radius is 24 mm, and the radial length is 48 mm. Optionally the rotor may be provided with a turned rim to help prevent magnets from being displaced by centripetal forces. Also the magnet can be a one piece ring magnet or a number of closely spaced or contacting arc magnets.

There is typically an air gap of 1.5 mm between the rotor and the stator. This is significantly greater than the usual air gap to be found in an induction motor, and provides more tolerance during manufacture and for play or wear within bearings. Optionally this air gap may be increased—even during a cycle of operations—in order to decrease the coupling of the motor The characteristics of the windings are: Three-phase windings of 1 mm insulated copper wire, ten turns per pole, for a total of 280 turns. The line-to-line resistance is 2.3 ohms; the line-to-line inductance is 4 millihenries. A full lap winding technique is used.

The characteristics of the magnetic field may be inferred in a pragmatic way from the above windings characteristics together with the performance details of the motor—its back-EMF (k.V) is 130 volts per thousand RPM; and its torque coefficient is 1.2 Nm per A.

This preferred embodiment is illustrated in FIG. 4, wherein 400 represents the winding array on a moulded stator, having ribs (e.g. 401) separating individual windings (402); there being three groups of windings per pole in this three-phase machine. The central aperture 403 is surrounded by part of the stator plate, bearing mounting holes.

In FIG. 5, 500 depicts the rotor bearing 28 magnets 501, alternately presenting a south pole 502 and a north pole 503 to the windings. 504 is a central aperture at which the rotor plate is fastened to the spindle of the motor (not shown).

Further variations on these embodiments include (but are not limited to) (a) versions having a stator bearing non-rotating windings located substantially symmetrically between two rotors, and optionally each rotor bears, adjacent to the stator, magnets having poles opposite to those of the opposing rotor, so that magnetic field lines lie perpendicular to the windings, or (b) one rotor is a ferromagnetic substance that directs the magnetic field of the magnets on the other rotor through the windings.

Finally it will be appreciated that various other alterations or modifications may be made to the foregoing without departing from the scope of this invention as set forth in the following claims.

I claim:

1. A discoidal dynamo-electric machine having a discoidal stator and a discoidal rotor mounted on a central shaft so that the rotor can be positioned close to and rotate in a plane parallel to that of the stator with a gap therebetween, a plurality of permanent magnetic poles mounted on or in a surface of the discoidal rotor facing the stator, said stator having a plurality of wound poles on or in a substrate of the stator, wherein a majority of said wound poles are positioned on or in that surface of the stator which faces said rotor so that the wound poles are adjacent said gap, and the permanent magnetic poles are closely spaced in the form of a circular array around the rotor surface such that there are short substantially semi-circular magnetic flux paths between adjacent permanent magnetic poles, said short magnetic flux paths extending in a region intersected by said majority of said wound poles whereby said majority of said wound poles intersect substantially all of the magnetic flux paths substantially at right angles thereto, said region having a magnetic permeability of less than 20 relative to air and being substantially non-conducting.

2. A discoidal dynamo-electric machine as claimed in claim 1, wherein the substrate of the stator has a magnetic permeability of less than 20 relative to air.

3. A discoidal dynamo-electric machine as claimed in claim 1, wherein there are no less than 8 and no more than 64 permanent magnetic poles on said rotor.

4. A discoidal dynamo-electric machine as claimed in claim 1, wherein there are about 28 permanent magnetic poles on said rotor.

5. A discoidal dynamo-electric machine as claimed in claim 1, wherein the gap between said rotor and said stator is about 1.5 mm.

6. A discoidal dynamo-electric machine as claimed in claim 1, wherein the stator has an array of windings which meander on a repetitive series of radial paths, the number of such paths being equal to the number of permanent magnetic poles.

7. A discoidal dynamo-electric machine as claimed in claim 1, wherein the windings are upon or within a substrate having a magnetic permeability of less than 20, relative to air.

8. A discoidal dynamo-electric machine as claimed in claim 6 wherein the permanent magnetic poles are provided by a plurality of high strength magnets each shaped in the form of a truncated sector of a circle so that they maintain close spacing between adjacent magnets in the circular array.

9. A discoidal dynamo-electric machine as claimed in claim 1, wherein the rotor is formed from a ferromagnetic material.

10. A discoidal dynamo-electric machine as claimed in claim 1, wherein the rotor is formed from a mild steel plate.

11. A discoidal dynamo-electric machine as claimed in claim 1, wherein said ferromagnetic material is selected from the group comprising powdered ferrite, iron or steel tape, iron or steel wire, and iron sand.

12. A discoidal dynamo-electric machine having a discoidal stator and a discoidal rotor mounted on a central shaft so that the rotor can be positioned close to and rotate in a plane parallel to that of the stator with a gap therebetween, a plurality of permanent magnetic poles mounted on or in a surface of the discoidal rotor facing the stator, said stator having a plurality of wound poles on or in a substrate of the stator, wherein a majority of said wound poles are positioned on or in that surface of the stator which faces said rotor so that the wound poles are adjacent said gap, and a ferromagnetic material having a permeability of over 20 relative to air is situated adjacent the wound poles, and the permanent magnetic poles are closely spaced in the form of a circular array around the rotor surface such that there are short magnetic flux paths between adjacent permanent magnetic poles, said relatively short magnetic flux paths between adjacent permanent magnetic poles, said short magnetic flux paths extending through a region intersected by said majority of said wound poles whereby said majority of said wound poles intersect substantially all of the magnetic flux paths substantially at right angles thereto.

13. A discoidal dynamo-electric machine as claimed in claim 12, wherein there are no less than 8 and no more than 64 permanent magnetic poles on said rotor.

14. A discoidal dynamo-electric machine as claimed in claim 12, wherein there are about 28 permanent magnetic poles on said rotor.

15. A discoidal dynamo-electric machine as claimed in claim 12, wherein the gap between the rotor and stator is about 1.5 mm.

16. A discoidal dynamo-electric machine as claimed in claim 12, wherein the stator has an array of windings which meander on a repetitive series of radial paths, a number of such paths being equal to the number of permanent magnetic poles.

* * * * *